United States Patent
Benhanokh et al.

(10) Patent No.: US 7,793,166 B2
(45) Date of Patent: Sep. 7, 2010

(54) METHODS AND SYSTEMS FOR RECOVERING META-DATA IN A CACHE MEMORY AFTER A CORRUPTION EVENT

(75) Inventors: Zvi Gabriel Benhanokh, Brookline, MA (US); Matthew Ivester, North Attleboro, MA (US); Ran Margalit, Swarthmore, PA (US)

(73) Assignee: EMC Corporation, Hopkinton, MA (US)

( * ) Notice: Subject to any disclaimer, the term of this patent is extended or adjusted under 35 U.S.C. 154(b) by 417 days.

(21) Appl. No.: 11/563,467

(22) Filed: Nov. 27, 2006

(65) Prior Publication Data

US 2008/0126841 A1    May 29, 2008

(51) Int. Cl.
*G06F 11/00* (2006.01)
(52) U.S. Cl. .......................................... 714/54; 711/144
(58) Field of Classification Search ...................... 714/8, 714/52, 54; 711/144
See application file for complete search history.

(56) References Cited

U.S. PATENT DOCUMENTS

| | | | |
|---|---|---|---|
| 6,161,192 A * | 12/2000 | Lubbers et al. | 714/6 |
| 6,480,970 B1 * | 11/2002 | DeKoning et al. | 714/6 |
| 6,502,174 B1 * | 12/2002 | Beardsley et al. | 711/170 |
| 6,658,592 B1 * | 12/2003 | Cohen et al. | 714/6 |
| 7,159,150 B2 * | 1/2007 | Kenchammana-Hosekote et al. | 714/43 |
| 2003/0145270 A1 * | 7/2003 | Holt | 714/766 |
| 2003/0163777 A1 * | 8/2003 | Holt | 714/763 |
| 2004/0123032 A1 * | 6/2004 | Talagala et al. | 711/114 |
| 2004/0153746 A1 * | 8/2004 | Talagala et al. | 714/8 |

* cited by examiner

*Primary Examiner*—Robert Beausoliel
*Assistant Examiner*—Elmira Mehrmanesh
(74) *Attorney, Agent, or Firm*—Muirhead and Saturnelli, LLC

(57) ABSTRACT

A method for recovering meta-data that has been subjected to corruption is disclosed for a cache memory. Each table entry in the cache memory has an in-cache indicator for indicating whether the data unit associated therewith is stored in a cache-slot in the cache memory. A first review is conducted of the table entries for identifying in-cache table entries (those that are associated with cache-slots in the cache memory), performing a correction attempt to ensure that the meta-data in an in-cache table entry are validated and corrected, if necessary, and ensuring that the in-cache indicator is set for an in-cache table entry. A second review is conducted of the table entries to ensure that the in-cache indicator is not set for any table entry that is not an in-cache table entry or for any in-cache table entry for which the correction attempt was unsuccessful.

18 Claims, 11 Drawing Sheets

METHODS AND SYSTEMS FOR RECOVERING META-DATA IN A CACHE MEMORY AFTER A CORRUPTION EVENT

RELATED APPLICATIONS

This application is related to co-pending U.S. patent application Ser. No. 11/563,450, entitled METHODS AND SYSTEMS FOR MANAGING CORRUPTED META-DATA IN A COMPUTER SYSTEM OR NETWORK, filed on Nov. 27, 2006, and hereby incorporated by reference.

BACKGROUND OF THE INVENTION

1. Field of the Invention

The present invention relates to generally to data storage systems, and more particularly, but without limitation, to recovering meta-data in a cache memory (hereinafter cache data) after a corruption event.

2. Description of the Prior Art

Computer systems may include different resources that may be coupled to and used by one or more host processors. Resources and host processors may be interconnected by one or more communication connections. These resources may include, for example, data storage systems that provide storage services to each host processor. An example data storage system may include one or more data storage devices that are connected together and may be used to provide common data storage for one or more host processors in a computer system.

Data storage systems may also have cache memory connected to the data storage devices for storing frequently accessed data for rapid access. Typically, it is time-consuming to fetch or compute data stored in the data storage devices. However, once data are stored in the cache memory, future use could be made by accessing the cached copy rather than re-fetching or re-computing the original data, so that average access time to data may be made lower.

A cache memory may include a data area and meta-data area. The data area 325 is an area of cache memory 320 containing cache-slots for relatively temporary in-cache storage of data units. The data area provides relatively quick access to data units as compared to the operation of data storage devices 350, 355, and 360. The meta-data area stores meta-data, or information about data units stored in data storage devices. The meta-data are associated with data units that are stored in the data area or in other data storage devices, including logical volumes. When corruption occurs in the meta-data but not in the data area associated therewith, typically attempts are made to correct the corrupted meta-data. Upon occurrence of a corruption event, corruption may occur in all of or only portions of the meta-data area. Depending upon the extent of the damage, it may be necessary to bring the system off-line to make the corrections. Whether the data storage system remains on-line or is taken off-line, the meta-data recovery process starts by scrutinizing the meta-data area for indications of corruptions. If only a small amount of meta-data is identified as having been corrupted, the meta-data can be corrected in a conventional manner, for example by recreating the meta-data. If larger amounts of meta-data are corrupted, correcting the meta-data in a conventional way can result in the system being off-line for unacceptable amounts of time.

Many approaches have been developed for protecting critical data stored in a data storage system against loss resulting from power failures or transients, equipment malfunctions and other causes. In one approach, all of or selected portions of the stored data can be transferred to tape or other backup media thereby to backup the cache memory system by providing a "snapshot" of the cache memory system at the time of the backup. In the event of a data loss, the backup copy can then be used to restore the data to the operational digital data system. However, the time to complete such a backup may be extensive. It may also take a significant time to restore the information, particularly if a storage system, such as a disk drive, fails completely.

In data processing systems that require essentially full-time availability and that incorporate large memory systems, data restoration may involve providing backup power, such as batteries, to the data system so that, upon power loss, data stored in more volatile memory systems can be written onto storage devices such as disks involving less volatile data storage. Once power is restored, the memory tables can be rebuilt. However, when the batteries are deflected or have failed and the system has insufficient time or power to store the data onto storage devices such as disks, it may be necessary to recover the meta-data on an entry by entry basis.

In the past, the recovery process for meta-data following significant corruption events involved taking the system off-line to rebuild the meta-data for all of the table entries irrespective of whether the data units associated with them was "in-cache" or "out-of-cache". The time that a system was off-line can have been extensive while the meta-data associated with a data unit that was not likely to be required by a user was being repaired. Co-pending U.S. patent application Ser. No. 11/563,450, entitled METHODS AND SYSTEMS FOR MANAGING CORRUPTED META-DATA IN A COMPUTER SYSTEM OR NETWORK, filed on even date herewith, discloses managing data repair by deferring validation and repair of corrupted meta-data until the first time an attempt is made to access the table entries with which the meta-data are associated. Using the invention therein, a computer system may return to being on-line more quickly than it would have been previously after a potential corruption event. There may be delays after a corruption event while critical meta-data are being repaired. However, over time the delay will be reduced until normal operating access is eventually restored.

Even with the use of the use of the invention described in the co-pending U.S. patent application described above, it is advantageous to provide for repair and validation of as much meta-data as possible as quickly as possible in order to avoid interruptions in normal operation of the data storage system.

SUMMARY OF THE INVENTION

Advantages of the invention will be set forth in part in the description which follows, and in part will be obvious from the description, or may be learned by practice of the invention. The advantages of the invention will be realized and attained by means of the elements and combinations particularly pointed out in the appended claims.

In accordance with the purpose of the invention, as embodied and broadly described herein, in one embodiment, the invention comprises a method for meta-data recovery in which meta-data that are associated with data currently in-cache are validated and repaired, if necessary, and the remainder meta-data are marked out-of-cache. In another aspect of the invention, validation and repair of the remainder meta-data are deferred until the first time an attempt is made to access them, in accordance with the invention described in the co-pending U.S. patent application Ser. No. 11/563,450, entitled METHODS AND SYSTEMS FOR MANAGING CORRUPTED META-DATA IN A COMPUTER SYSTEM OR NETWORK, filed on even date herewith.

In one embodiment, the invention comprises a method for recovering meta-data in a cache memory, when the meta-data have been subjected to corruption. The cache memory has meta-data organized into a plurality of table entries and data units stored in a plurality of cache-slots. Each cache-slot is arranged to be associated with one of the table entries. Each table entry is provided with an in-cache indicator to indicate that the data unit associated therewith is stored in the cache memory. Meta-data are recovered by conducting a first review of the table entries to identify in-cache table entries, comprising the table entries that are associated with cache-slots in the cache memory. A correction attempt is performed on each of the in-cache table entries to ensure that the meta-data in each of the in-cache table entries are validated and corrected, if necessary. The in-cache indicator is set or left set for each of the in-cache table entries to ensure that the in-cache table entries are identified as being in-cache.

In the method of this embodiment of the present invention, a second review of the table entries is conducted to identify not-in-cache table entries comprising the table entries that are not associated with cache-slots in the cache memory. Invalid table entries, comprising the in-cache table entries for which the correction attempt was unsuccessful, are also identified. The in-cache indicator is unset for any of the invalid table entries, and it is unset or left unset for any of the not-in-cache table entries to ensure that the invalid table entries and not-in-cache table entries are identified as being out-of-cache.

In one aspect of this embodiment, conducting the first review further comprises conducting a seriatim review of each of the cache-slots. The seriatim review comprises selecting a first cache-slot; identifying a first table entry that is associated with the first cache-slot; and determining whether the first table entry is in need of repairing. When the first table entry is determined to be in need of repairing, a correction attempt is performed to correct and verify validation of the meta-data in the first table entry, if it is determined that the first table entry is in need of repairing.

In a further aspect of this embodiment, each of the table entries has a stored meta-data protection value and each of the cache-slots has a backup table entry comprising a backup copy of an associated table entry comprising a table entry associated therewith. The method further comprises conducting a data protection correction process to verify validity of a data protection portion of the first table entry by calculating a test meta-data protection value from the first table entry and comparing the test meta-data protection value and the stored meta-data protection value. When the test meta-data protection value and the stored meta-data protection value do not match, the backup table entry is collected reviewed to determine whether it is need of repairing, and, if not, is used to replace the first table entry.

In a further aspect of this embodiment, the first table entry has a cache-slot association link comprising a pointer to one of the cache-slots to link the first table entry to the one of the cache-slots. The method further comprises a lookup table correction process to verify validity of a lookup table portion of the first table entry. In the lookup table correction process, the cache-slot association link from the first table entry to the first cache-slot is confirmed by using the cache-slot association link to access the one of the cache-slots; and replacing the cache-slot association link with a pointer to the first cache-slot if the cache-slot association link did not access the first cache-slot.

In a further aspect of this embodiment, conducting the second review further comprises conducting a seriatim review of each of the table entries. A first table entry is selected and a determination is made whether the first table entry is in need of repairing. When the first table entry is in need of repairing, the in-cache indicator is unset or left unset to ensure that it is unset for a table entry in need of repair.

In a further aspect of this embodiment, each of the table entries has a stored meta-data protection value. The method further comprises conducting a data protection validation process to verify validity of a data protection portion of the first table entry. A test meta-data protection value is calculated from the first table entry and is compared the stored meta-data protection value. When the test meta-data protection value and the stored meta-data protection do not match, the in-cache indicator is unset or left unset to ensure that it is unset for table entries having invalid data protection.

In a further aspect of this embodiment, the first table entry has a cache-slot association link comprising a pointer to one of the cache-slots to link the first table entry to the one of the cache-slots. The method further comprises conducting a lookup table validation process to verify validity of a lookup table portion of the first table entry. The lookup table validation process further comprises confirming the cache-slot association link from the first table entry to the first cache-slot by using the cache-slot association link to access the one of the cache-slots. When the cache-slot association link does not access the first cache-slot, the in-cache indicator is unset or left unset to ensure that it is unset for table entries having improper associations to the cache memory.

In a further aspect of this embodiment, each of the table entries has a data protection process associated therewith. The method further comprises suspending the data protection process for any of the table entries for which the in-cache indicator is not set. Re-establishing the data protection process for a first table entry for which the in-cache indicator is not set is deferred until issuance of a request for an I/O operation therefor. In a further aspect, the data protection process is suspended for any of the not-in-cache table entries and for any invalid table entries, and re-establishing the data protection process is deferred for a first not-in-cache table entry or a first invalid table entry until issuance of a request for an I/O operation therefor.

In a further embodiment of the invention, a computer program product resides on a computer readable medium is provided for recovering meta-data for a computer system that have been subjected to corruption. The computer system has a cache memory with the meta-data, organized into a plurality of table entries, and data unit stored in a plurality of cache-slots. Each of the cache-slots is arranged to be associated with one of the table entries.

The computer program product has instructions for causing a computer to conduct a first review of the table entries. In the first review, in-cache table entries comprising the table entries that are associated with cache-slots in the cache memory are identified. A correction attempt is performed on each of the in-cache table entries to ensure that the meta-data in each of the in-cache table entries are validated and corrected, if necessary. The in-cache indicator is set or left set for each of the in-cache table entries to ensure that the in-cache table entries are identified as being in-cache.

The computer program product also comprises instructions for causing a computer to conduct a second review of the table entries. In the second review, not-in-cache table entries, comprising the table entries that are not associated with cache-slots in the cache memory, are identified. Invalid table entries comprising the in-cache table entries for which the correction attempt was unsuccessful are also identified. The in-cache indicator is unset for any of the invalid table entries, and it is unset or left unset for any of the not-in-cache table entries to ensure that the invalid table entries and not-in-cache table entries are identified as being out-of-cache.

In a further aspect of this embodiment, the first review comprises instructions to cause a computer to conduct a seriatim review of each of the cache-slots. The seriatim review further comprises selecting a first cache-slot; identifying a first table entry that is associated with the first cache-slot; and determining whether the first table entry is in need of repairing. If necessary, a correction attempt is performed to ensure that the meta-data in the first table entry are validated and corrected.

In a further aspect of this embodiment, the second review of the table entries comprises instructions to cause a computer to conduct a seriatim review of each of the table entries. The seriatim review further comprises selecting a first table entry; and determining whether the first table entry is in need of repairing. When the first table entry is in need of repairing, the in-cache indicator is unset or left unset to ensure that it is unset for a table entry in need of repair.

In a further aspect of this embodiment, each of the table entries has a data protection process associated therewith, and the computer program product has instructions for causing a computer to suspend the data protection process for any of the table entries for which the in-cache indicator is not set. The computer program product has instructions for causing a computer to defer re-establishing the data protection process for a first table entry for which the in-cache indicator is not set until issuance of a request for an I/O operation therefor. In a further aspect, the computer program product has instructions for causing a computer to suspend the data protection process for any of the not-in-cache table entries and for any invalid table entries, and for deferring re-establishing the data protection process for a first not-in-cache table entry or a first invalid table entry until issuance of a request for an I/O operation therefor.

In a further embodiment of this invention, a data storage system comprises a cache memory having meta-data organized into a plurality of table entries, and data units stored in a plurality of cache-slots. Each cache-slot is arranged to be associated with one of the table entries. A processor coupled to the cache memory is operable to recover meta-data that have been subjected to corruption.

The processor is further operable to conduct a first review of the table entries to identify in-cache table entries comprising the table entries that are associated with cache-slots in the cache memory. In the first review, a correction attempt is performed on each of the in-cache table entries to ensure that the meta-data in each of the in-cache table entries are validated and corrected, if necessary. The in-cache indicator is set or left set for each of the in-cache table entries to ensure that the in-cache table entries are identified as being in-cache.

The processor is further operable to conduct a second review of the table entries to identify not-in-cache table entries. In the second review, not-in-cache table entries, comprising the table entries that are not associated with cache-slots in the cache memory, are identified. Further, invalid table entries, comprising the in-cache table entries for which the correction attempt was unsuccessful, are identified. The in-cache indicator is unset for any of the invalid table entries, and it is unset or left unset for any of the not-in-cache table entries to ensure that the invalid table entries and not-in-cache table entries are identified as being out-of-cache.

In a further aspect of this embodiment, in the first review, the processor is operable to conduct a seriatim review of each of the cache-slots. The seriatim review further comprises selecting a first cache-slot; identifying a first table entry that is associated with the first cache-slot; and determining whether the first table entry is in need of repairing. If necessary, a correction attempt is performed to ensure that the meta-data in the first table entry are validated and corrected.

In a further aspect of this embodiment, in the second review, the processor is operable to conduct a seriatim review of each of the table entries. The seriatim review further comprises selecting a first table entry; and determining whether the first table entry is in need of repairing. When the first table entry is in need of repairing, the in-cache indicator is unset or left unset to ensure that it is unset for a table entry in need of repair.

In a further aspect of this embodiment, each of the table entries has a data protection process associated therewith, and the processor is operable to suspend the data protection process for any of the table entries for which the in-cache indicator is not set. The processor is operable to defer re-establishing the data protection process for a first table entry for which the in-cache indicator is not set until issuance of a request for an I/O operation therefor. In a further aspect, the processor is operable to suspend the data protection process for any of the not-in-cache table entries and for any invalid table entries, and to defer re-establishing the data protection process for a first not-in-cache table entry or a first invalid table entry until issuance of a request for an I/O operation therefor.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE PREFERRED EMBODIMENT(S)

Reference is now made in detail to exemplary embodiments of the invention, examples of which are illustrated in the accompanying drawings.

Figure 1:
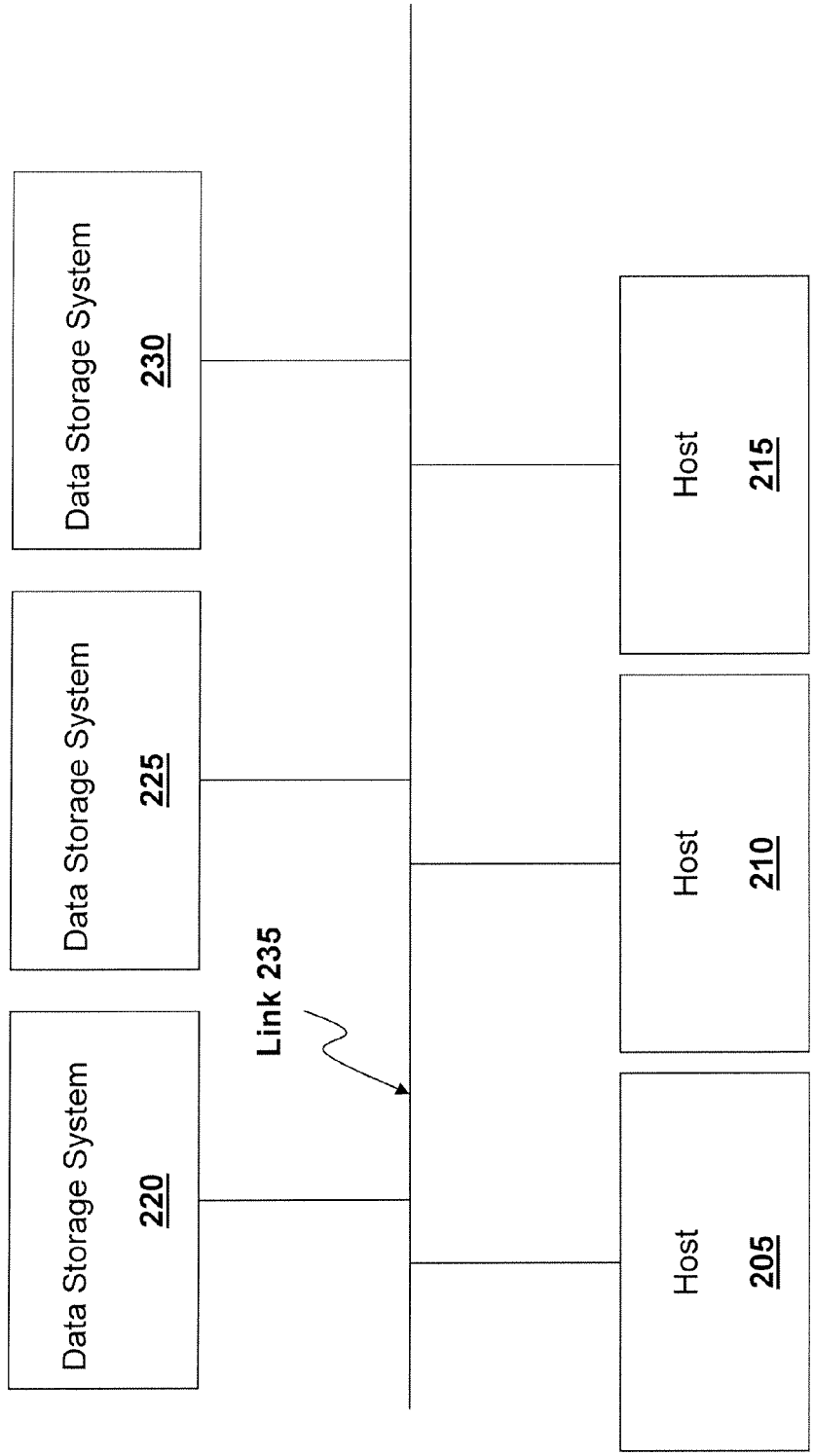
FIG. 1 is a block diagram of a functional architecture for a computer system, according to an embodiment of the invention.

FIG. 1 is a block diagram of a functional architecture for a computer system, according to an embodiment of the invention. Computer systems may include different resources that may be coupled to and used by one or more host processors. These resources may include, for example, data storage systems such as the SYMMETRIX™ family of data storage systems manufactured by EMC Corporation, of Hopkinton, Mass. Resources and host processors may be interconnected by one or more communication connections. As shown in FIG. 1, host processors, or hosts, or host systems 205, 210, and 215, are coupled to each of data storage systems 220, 225, and 230, via link 235. Link 235 may be or include the Internet, an intranet, a wired link, a wireless link, or other link, and may utilize Transmission Control Protocol/Internet Protocol (TCP/IP), Small Computer System Interface (SCSI), Fibre Channel, or other communications protocol. Link 235 may also represent a plurality of links of the same or different types; all or a portion of these links may be redundant. Any host can access data in any one or more data storage systems, and data may be transferred between data storage systems.

Variations to the architecture illustrated in FIG. 1 are possible. For example, the number of hosts need not equal the number of data storage systems. And there is no theoretical limit to the number of either type of functional component.

Figure 2:
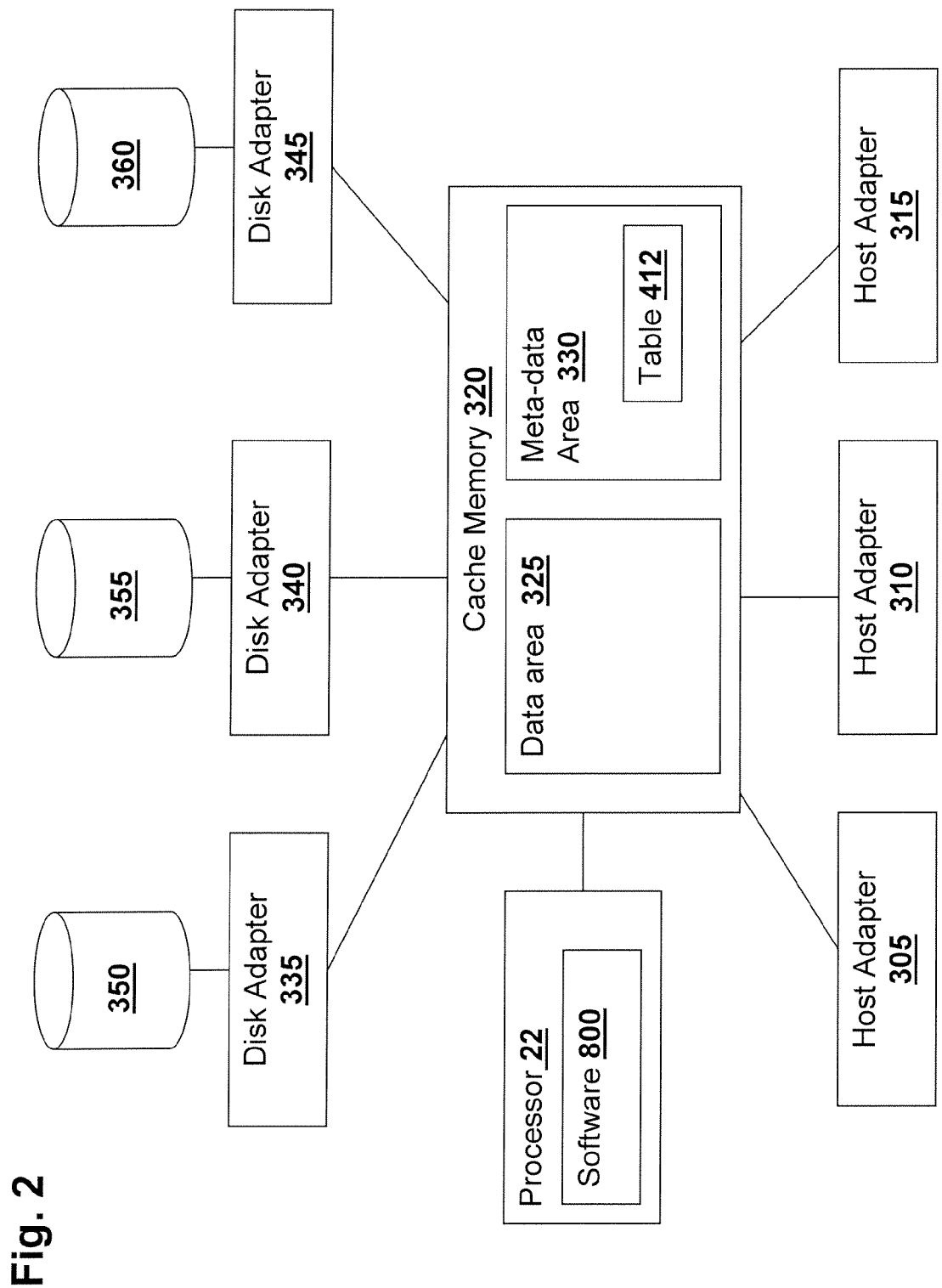
FIG. 2 is a block diagram of a functional architecture of a data storage system in a computer system, according to an embodiment of the invention.

FIG. 2 is a block diagram of a functional architecture of a data storage system 220, according to an embodiment of the invention. The block diagram illustrated in FIG. 2 represents an exemplary embodiment of any one or more of data storage systems 220, 225, and 230. As illustrated in FIG. 2, the system 220 may also include one or more host adapters 305, 310, and 315, which are coupled to a cache memory 320. One or more of the host adapters 305, 310, and 315 may be or include, for example, a Fibre Channel adapter. In operation, the host adapters 305, 310, and 315 provide a communication interface for any one or more of host systems 205, 210, 215, and may be used to manage communications and data operations between one or more host systems and the cache memory.

Each of the disk adapters 335, 340, and 345 are coupled to and between the cache memory 320 and a corresponding one of the data storage devices 350, 355, and 360. The disk adapters 335, 340, and 345 are responsible for the backend management of operations to and from a portion of the data storage devices 350, 355, 360. Each of the data storage devices 350, 355, 360 may be physical devices, such as disks, and may be organized and segmented into one or more logical volumes (LVs), which are logical representations of physical volumes.

Variations to the architecture illustrated in FIG. 2 are possible. For example, each one or more of the disk adapters 335, 340, and 345 may manage read and write operations associated with more than a single disk. Moreover, any one or more disks associated with a disk adapter may be considered a logical volume, although the term logical volume is not intended to be limited by this example.

As also illustrated in FIG. 2, the cache memory 320 may include a data area 325 and meta-data area 330. The data area 325 is an area of cache memory 320 for relatively temporary data storage and relatively quick access as compared to the operation of data storage devices 350, 355, and 360. The meta-data area 330 stores meta-data, or information about data stored in data storage devices 350, 355, and 360. The meta-data area 330 may have a table 412 that is indexed, for example, by track or other portion of a logical volume, for storing the meta-data.

Each of the disk adapters 335, 340, and 345 control data read and write operations associated with corresponding data storage devices 350, 355, and 360. Each of the disk adapters 335, 340, and 345 may also enable communications between a corresponding data storage device and the cache memory 320. The cache memory 320 may facilitate data transfer between any one of the host adapters 305, 310, and 315, and any one of the disk adapters 335, 340, and 345. In addition, to the extent that data residing in data storage devices 350, 355, and 360 may be transferred between disks, the cache memory 320 may facilitate such disk-to-disk data transfer.

The disk adapters 335, 340, and 345 may perform data operations to and from the cache memory 320, for example, in communications with other disk processors or directors, and other components of the data storage system. Generally, the cache memory 320 may be used in facilitating communications between components in the data storage system.

The particular data storage system as described in this embodiment, such as a SYMMETRIX™ system by EMC Corporation, of Hopkinton, Mass. or a disk, should not be construed as a limitation. Other types of commercially available data storage systems, as well as processors and hardware controlling access to these particular devices, may be also be included in an embodiment.

An embodiment of a data storage system 220 may include a processor 22 used to manage and monitor the system 220. The processor 22 may be any one of a variety of commercially available processors, such as an INTEL-based processor, and the like.

In one embodiment, the processor 22 may be used to control access to cache data in cache memory 320 by a user, such as hosts 205, 210, and 210 through the connection 32. The processor 22 may use a computer program product in the form of cache memory control software 800 to manage access to data stored in the cache memory 320.

The cache memory control software 800 may reside on any suitable computer readable medium, including but not limited to non-volatile Read Only Memory (ROM) or (2) being alterably stored on writable storage media such as compact disks (CDs), random access memory (RAM) devices, floppy disks, and other magnetic and optical media, or (3) being conveyed to a computer such as processor 22 through communication media, for example using baseband signaling or broadband signaling techniques, as in an electronic network such as the Internet or telephone modem lines. The operations and methods may be implemented in a software executable out of a memory by a computer such as processor 22 or as a set of instructions embedded in a carrier wave. Alternatively the operations and methods may be embodied in whole or in part using hardware components such as Application Specific Integrated Circuits (ASICs), state machines, controllers or other hardware components or devices, or a combination of hardware and software components.

In addition, although the details of the memory control software 800 may reside in a particular processor 22 associated with a data storage system 220, similar software components may exist in each of the other processors associated with other SYMMETRIX™ storage systems such as 225, 230. In other embodiments, this software 800 may also reside on any of the host systems 205, 210, 215 or on computer readable medium accessible by host systems 205, 210, 215 or processor 22.

As used herein, the meta-data table 412 refers broadly to a collection of meta-data for ready reference. In an embodiment of the invention, there may be a portion of a meta-data table associated with each portion of a logical volume. Virtually every operation conducted by the data storage system 220 will access the meta-data table 412. It is accessed, for example, when a track needs to be locked or unlocked, when it is necessary to identify whether or not a track is in-cache, or whether a mirror is valid, or while application bits need to be set.

Figure 3:
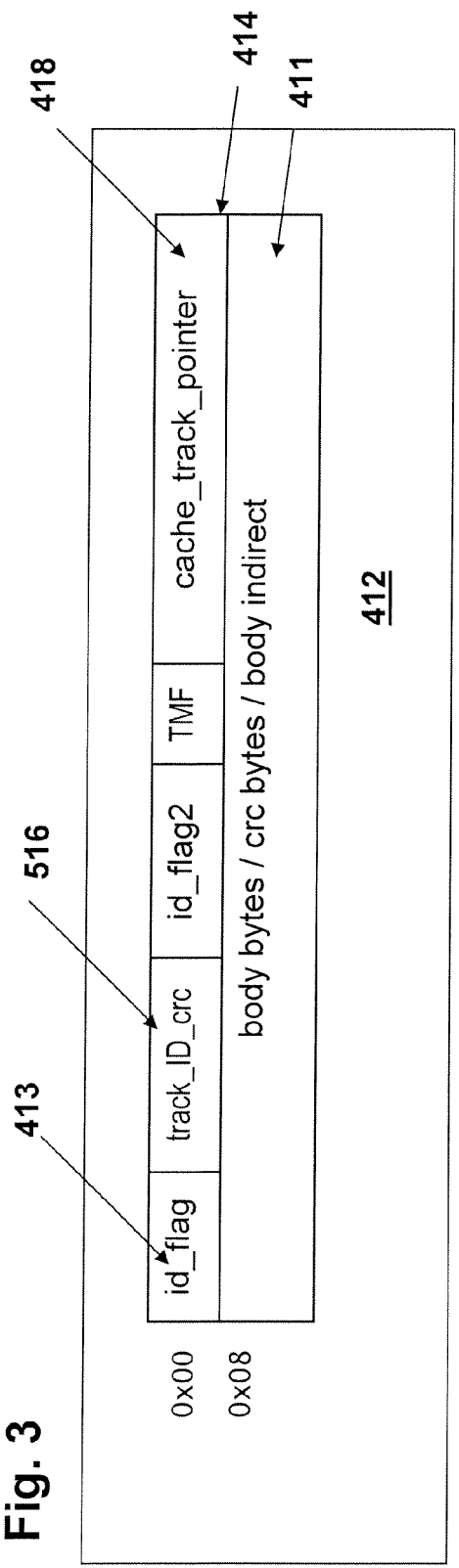
FIG. 3 is a block diagram of a table entry in a table in the meta-data area 330 shown in FIG. 2.

Variations to the meta-data table 412 illustrated in FIG. 3 are possible. For example, the size of the portion of the logical volume for which there is meta-data may vary. For instance, each portion of the logical volume may be 64K bytes (i.e., a track as that term is used herein). Alternatively, each portion of the logical volume may be larger or smaller. Where a logical volume is separated into smaller portions, more meta-data will be required. Similarly, where a logical volume is separated into larger portions, fewer meta-data will be required. The selection of the size of the portion of the logical volume is a trade-off between the amount of data needed to record the state of the logical volume and the granularity at which the state is recorded. For another example, the size of the portion of the meta-data table corresponding to a portion of a logical volume can be other than 16 bytes, and the type and position of application designations may be different than illustrated in FIGS. 3 and 4. Moreover, in alternative embodiments, there may be a separate meta-data table for each portion of a logical volume.

A meta-data table 412 may have multiple table entries 414, each comprising multiple fields. FIG. 3 is an illustration of a meta-data table entry 414 for storing the meta-data, according to an embodiment of the invention. While it is not necessary for the practice of the present invention, in the current embodiment, the table entry 414 has a data protection portion 654, to hold the meta-data useful in protecting the data unit 625, whether stored on-disk or in the cache-slot 514 in the data area associated with the entry 414, and a lookup table portion 656, to hold meta-data useful for managing the data unit 625.

In one embodiment, a backup table entry 914 is stored in the cache-slot 514 in the data area 325 associated with the table entry 414. The backup entry 914 is an exact copy of the table entry 414 for each in-cache data-unit 625. Each time the table entry 414 is updated, a copy of the table entry 414 may be stored in the cache-slot 514 in which the data unit 625 associated with the table entry 414 is stored. Each cache-slot 514 also has a backpointer field 518 for storing an address pointing back to the table entry 414 with which it is associated.

As shown in FIG. 3, table entry 414 indicates application designations for each field of the meta-data area 330. In the illustrated embodiment, the table entry 414 has a track_ID_crc field 516, for storing meta-data useful in protecting against corruption; an id_flag2 field, for storing meta-data defining disk layout; a track_mirror flag (TMF) field, for holding meta-data describing the status and other details about mirroring tracks; a cache_track_pointer field 518, for storing meta-data pointing to the location of the track or cache-slot 514 in the cache that is associated with the table entry 414; and body bytes/crc bytes/body indirect fields 411, for storing meta-data useful in describing the layout of the cache-slot 514 and protection of the data units regardless of their locations (disk or cache).

Figure 4:
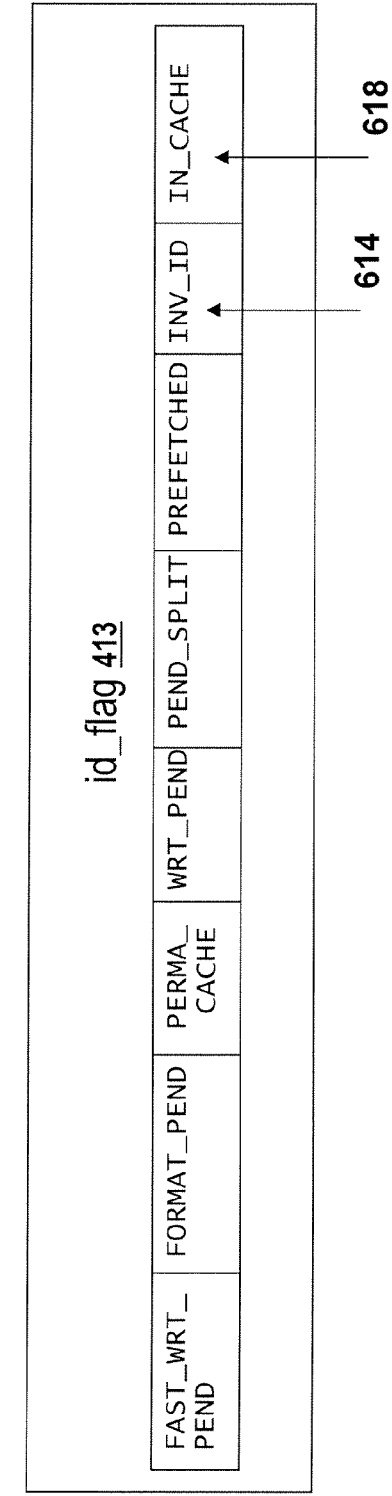
FIG. 4 is a block diagram of more detail of a table entry shown in FIG. 3.

The table entry 414 also has an id_flag field 413. As shown in FIG. 4, the id_flag field 413 is organized into multiple fields that can comprise sub-fields for storing meta-data describing the status of and other details about tracks. In the illustrated embodiment, the id_flag field 413 has an FAST_WRT_PEND field, for storing meta-data to identify the pendency of a fast write operation for the track; a FORMAT_PEND field, for storing meta-data identifying the pendency of a format change for the track; a WRT_PEND field, for storing meta-data identifying the pendency of a write operation for the track; a PREFETCHED field, for storing meta-data identifying whether the track has been prefetched into the cache memory 320; and an in_cache flag 618, for storing meta-data indicating that a copy of the track may be found in the data area 325 of cache memory 320.

Figure 5:
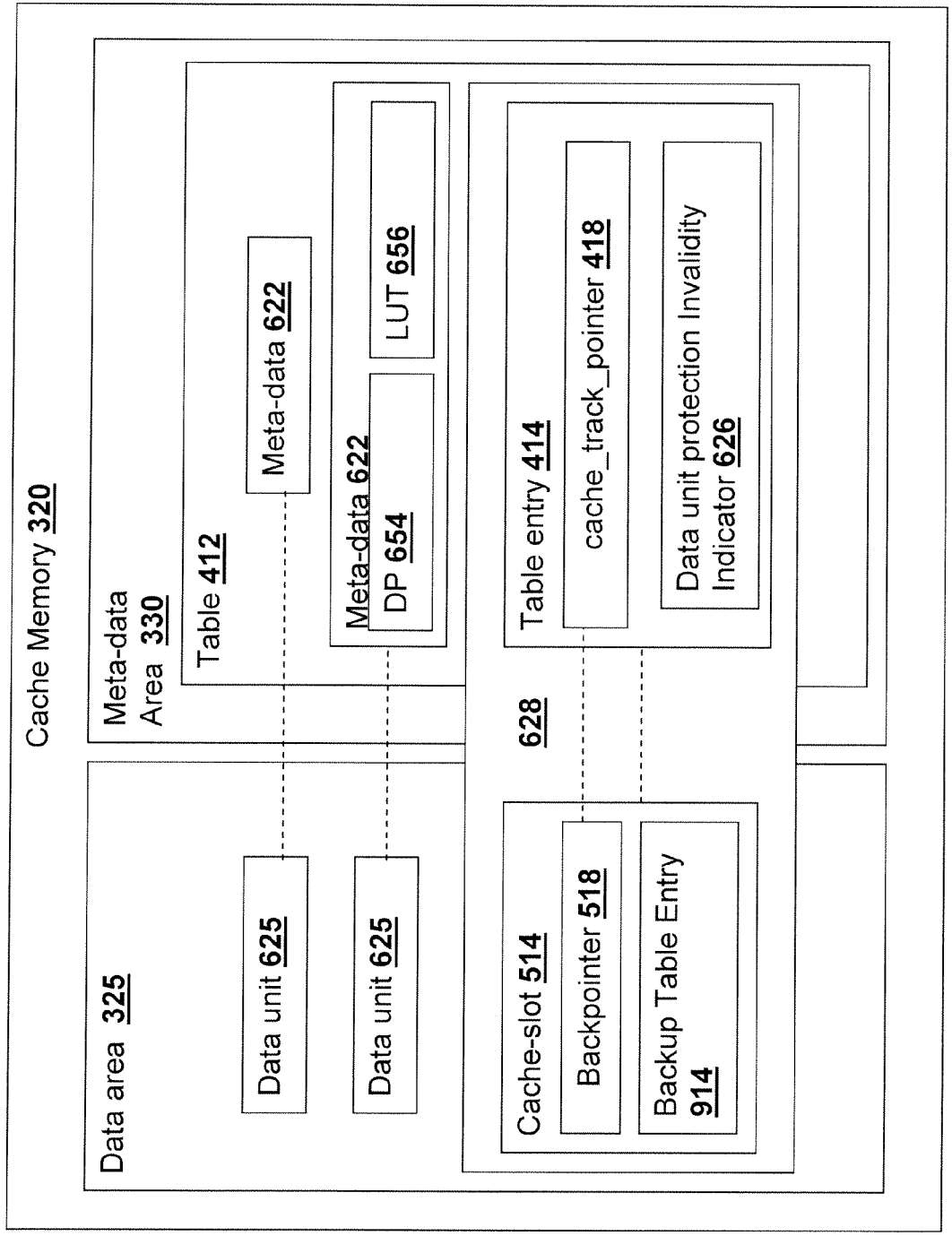
FIG. 5 is a block diagram showing the organization of data in the cache memory 320 in FIG. 2.

FIG. 5 is a block diagram showing the organization of data in the cache memory 320 in FIG. 2, according to one embodiment of the present invention. As noted above the cache memory 320 is organized into a data area 325 for storing data units, shown as 625, and a meta-data area 330 for storing meta-data, shown as 622 associated with the data units 625. A data-set 628 comprises the data unit 625 and the meta-data (table entry 414) associated with the data unit 625. The cache-slot 514 in which the data unit 625 is stored has a back-pointer to the table entry 414 with which is it associated and possibly a copy of the associated meta-data.

Figure 6:
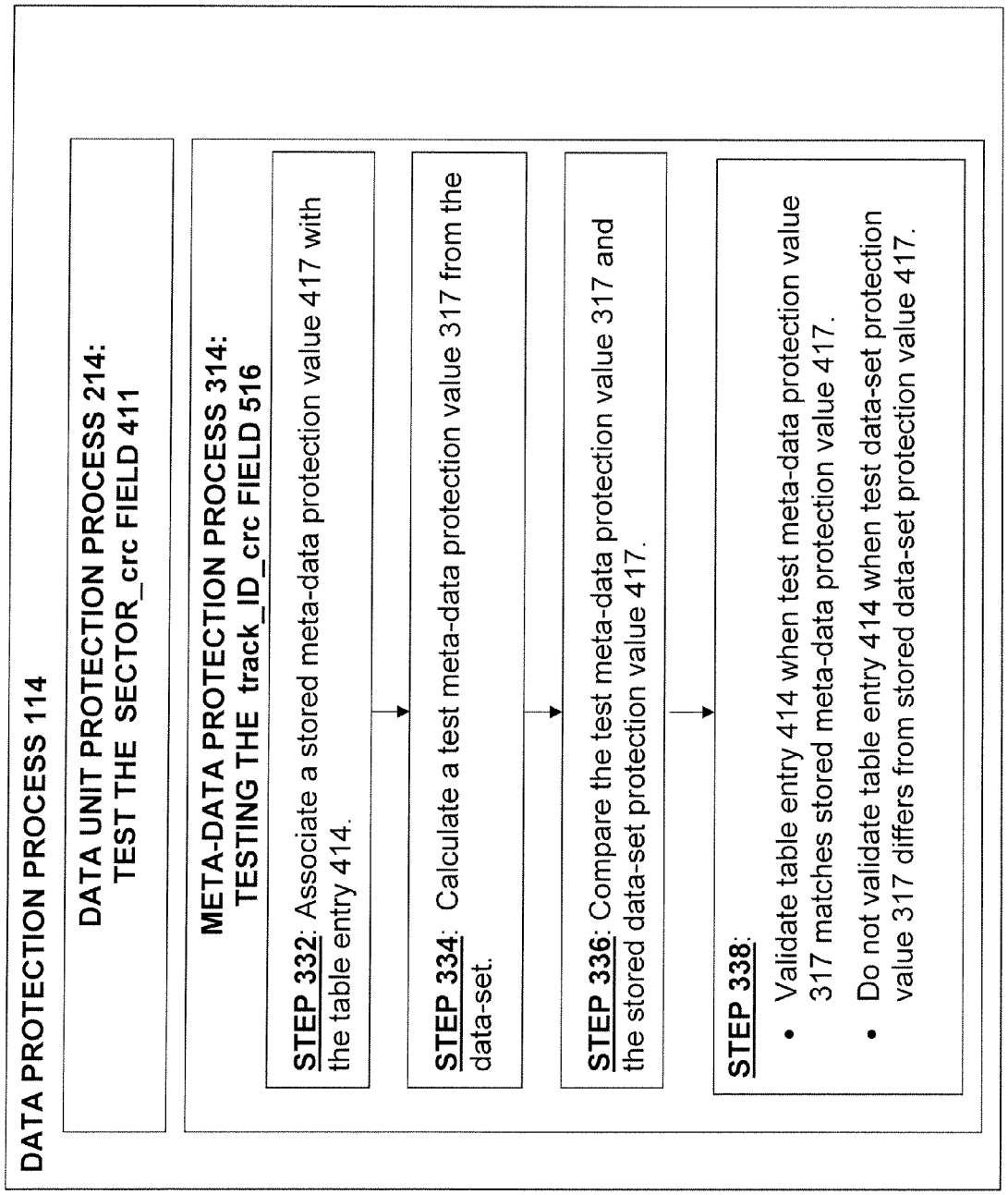
FIG. 6 is a flow diagram of the data protection process 114 for validating the protection of meta-data according to an embodiment of the invention.

On most accesses, the data protection integrity of the table entry 414 is verified by checking the track_ID_crc field 416, which, in the current embodiment is a meta-data protection field that is shared by the data protection portion and the lookup table portion of the table entry 414. The track_ID_crc field 416 is validated using the meta-data protection process 314 shown in FIG. 6. In a step 332, the meta-data protection process 314 starts by associating a stored meta-data protection value 417 with the table entry 414. The track_ID_crc field 416 holds stored meta-data protection value 417, which is an exclusive-OR (XOR) of the meta-data in the table entry 414 and is used to confirm the validity of the table entry 414.

It should be noted that the meta-data protection process 314 only partially verifies the data protection portion 654 of the table entry 414. It verifies the validity of the meta-data protection of the table entry 414. It does not verify the validity of the data unit protection of the table entry, namely the SECTOR_crc part of the fields 411. The meta-data protection process 314 t is only part of a data protection process 114, which also has a data unit protection process 214, for verifying the validity of the SECTOR_crc field 411 by accessing the data unit, not in the cache memory, but on the logical volume on which it resides, calculating a test data unit protection value 319 and comparing it to the data unit protection value 419 stored in the field 411. Since data protection verification requires an access to a logical volume, the verification is time-consuming. Upon occurrence of a corruption event, if it appears that much corruption has occurs, it is not preferable to take the system off-line while all of the suspected SECTOR_crc fields are validated.

The validity of the meta-data protection for the table entry 415 may be used as a predictor of the validity of the data unit protection, because, when corruption occurs, it is more likely that the data unit protection is invalid when the meta-data protection for the table entry 415 is rendered invalid also. Since it is less time-consuming to test the validity of the meta-data protection than it is to test the validity of the data unit protection, if the meta-data protection for the table entry 415 is considered to be valid, it will be assumed that the data unit protection for the table entry 415 is valid.

Any update to the table entry 414 requires an update to the track_ID_crc field 416, namely a recalculation of a track_ID_crc value 417 and storage of the recalculated value in the track_ID_crc field 416. Any access (read/write/administrative) of the table entry 414 requires a validation of the contents of the track_ID_crc field 416. Validation involves a step 334 of recalculating the track_ID_crc value 417 to form a test meta-data protection value 317 and a step 336 of comparing it to the stored meta-data protection value 417 in the track_ID_crc field 416. When the contents do not match the recalculated track_ID_crc value 417, the table entry 414 is not considered protected. In a step 338, the table entry 314 is validated when the test meta-data protection value 317 matches the stored meta-data protection value 417. It is not validated when the test meta-data protection value 317 differs from the stored meta-data protection value 417.

When the meta-data in the track_ID_crc field 416 is found to be wrong, every bit of meta-data in the table entry 414 is suspected of corruption. As noted above, the meta-data in the IN_CACHE field 618 indicate that a copy of the track may be found in the data area 325. When the IN_CACHE flag 618 is set, the cache_track_pointer field 518 contains meta-data pointing to the location of track in the cache, known here as the cache-slot 514. If the IN_CACHE field 618 is not set, the meta-data in the cache_track_pointer field 518 are meaningless. Because the cache_track_pointer field 518 is not cleared when a track goes out-of-cache, if corruption of the table entry 414 causes the IN_CACHE field 618 to switch its setting from "not set" to "set", the data storage system 220 would erroneously recognize that an out-cache-track is in-cache and, using the meaningless address of the cache-slot (pointed by the meta-data in the cache_track_pointer field 518), send the user wrong data. Further, if a write operation then occurred, the data storage system 220 would write to the meaningless address, removing correct information at the address and corrupting the data to another track.

In order to prevent improper reading and writing, the id_flag field 413 is provided with a data unit protection invalidity field 614, designated INV_ID, for indicating whether the data unit protection for the data unit stored in the track, as they are currently stored in the data area 325 or on any device or logical volume, is valid or potentially invalid. Generally, the invalidity field 614 constitutes a data unit protection invalidity indicator, and setting the invalidity field 614 thus constitutes providing a data unit protection invalidity flag indicating that the data unit protection for the data unit associated with the field 614 is not valid.

Figure 7:
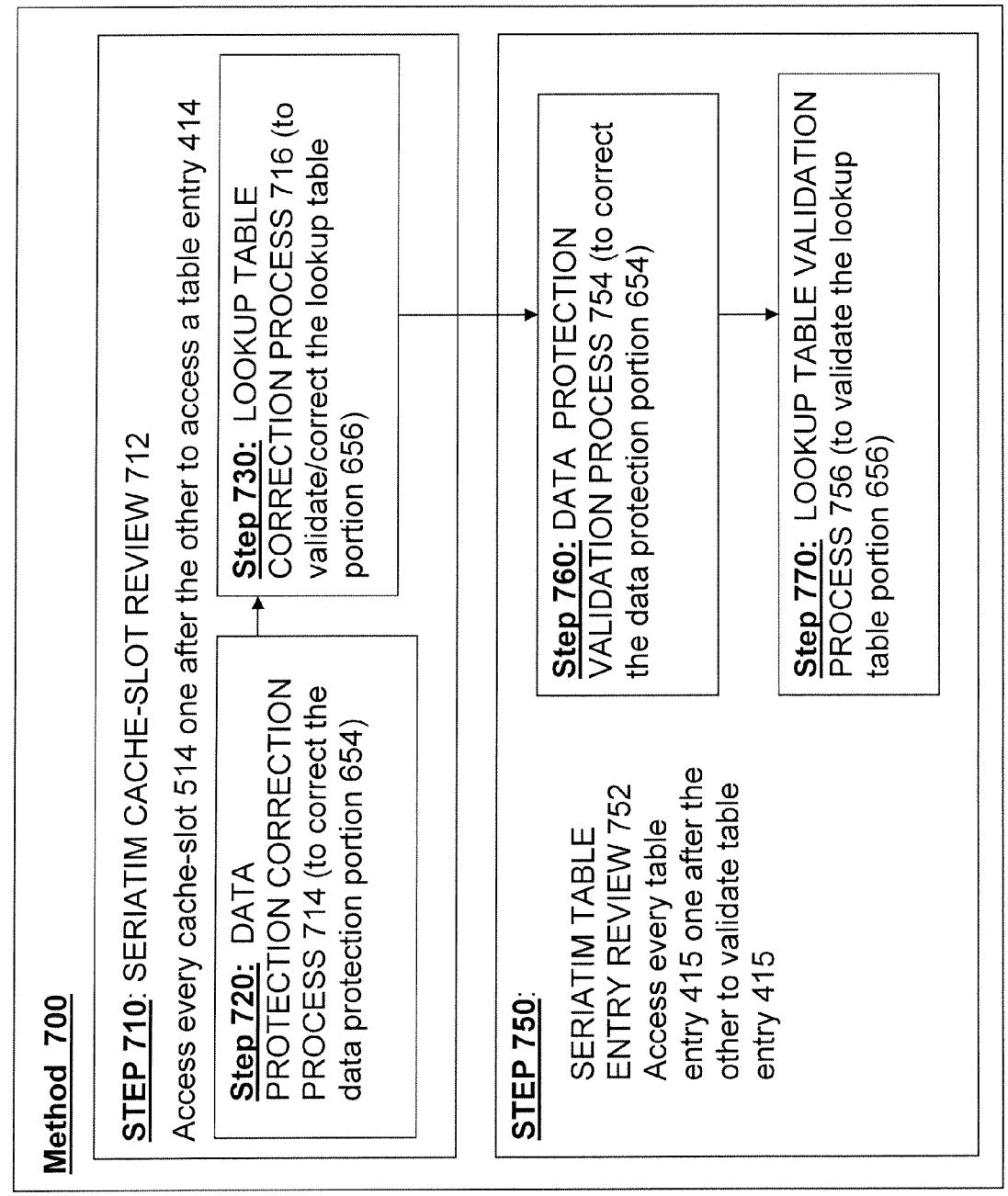
FIG. 7 is a method for recovery of the meta-data shown in FIG. 5 according to an embodiment of the invention.

FIG. 7 is a flow diagram of a method 700 for recovery of the meta-data shown in FIG. 5 according to an embodiment of the invention, in which table entries that are associated with data currently in-cache are validated and repaired, if necessary, and in which the table entries that are not so associated are marked out-of-cache. Specifically, in operation, the method 700 starts, in response to a corruption event, with a step 710 of conducting a seriatim cache-slot review 712, in which every cache-slot 514 in the data area 325 is accessed one after the other in order to identify and ensure the validity of each table entry 414 in the meta-data area that is currently associated with a cache-slot 514. The method 700 then proceeds with a step 750 to a seriatim table entry review 752, in which every table entry 415 in the meta-data area 330 is accessed one after the other, in order to ensure that all table entries 415 therein that are not properly associated with a cache-slot 515 in the data area are designated out-of-cache.

Seriatim Cache-Slot Review 712

For each cache-slot 514 in the data area, the seriatim cache-slot review 712 of step 710 starts by using the back pointer 518 stored in the cache-slot 514 to access a table entry 414 associated with the cache-slot 514. For each table entry 414 so accessed, the review 712 ensures the validity of each table entry 414 that is currently associated with the cache-slot 514.

The seriatim cache-slot review 712 comprises a step 720 of conducting a data protection correction process 714 to verify the validity of the data protection portion of the table entry 414 and correct it, if necessary, and a step 730 of conducting a lookup table correction process 716 to verify the validity of the lookup table portion of the table entry 414 and correct it, if necessary. The order in which these two corrections are conducted is irrelevant and may be selected at the convenience of the meta-data recovery process designer.

Data Protection Correction Process 714

Figure 8:
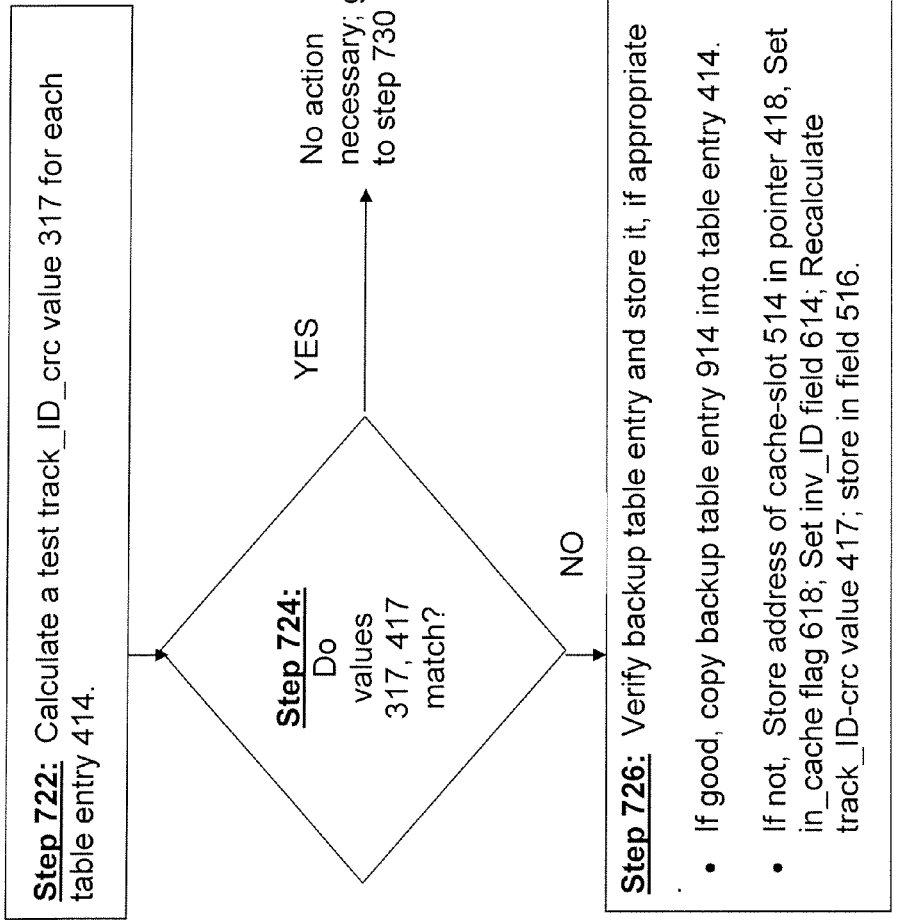
FIG. 8 is a flow diagram of the data protection correction process 714 of the seriatim cache-slot review 712 shown in FIG. 7.

As shown in FIG. 8, the data protection correction process 714 starts with a step 722 of calculating a test track_ID_crc value 317 for each table entry 414, and then proceeds to a step 724 of comparing the test track_ID_crc value 317 to the stored track_ID_crc value 417 in field 516 in the table entry 414. If the values 317, 417 match, the meta-data protection for the table entry 414 may be considered to be valid. Further, if the meta-data protection for the table entry 414 is considered to be valid, it will be assumed that the data unit protection for the table entry 414, which can only be checked using the time-consuming process of accessing the logical volume on which the data unit is more permanently stored, may be considered to be valid. No action is necessary.

If the test track_ID_crc value 317 does not match the stored value 417, the meta-data protection for the table entry 414 is invalid, and the table entry 414 needs to be corrected. The process 714 proceeds to a step 726 of copying the backup table entry 914 stored in the cache-slot 514. The contents of the backup entry 914 also need to be verified, and if, they are found to be correct in the manner discussed above and below (namely, proper association links, a set in_cache field 618, a valid track_ID_crc field 516), the backup entry 914 is copied into the table entry 414. The contents of the track_ID_crc field 516 in the table entry 414 are thus replaced by the contents of the track_ID_crc field in the backup table entry 914. If the backup copy can not be verified, the address of cache-slot 514 is stored in pointer 418, the in_cache flag 618 is set. Finally, the track_ID_crc value 417 is recalculated and stored in field 516.

In another embodiment, in which the cache-slot 514 does not store a backup entry 914, if the test track_ID_crc value 317 does not match the stored value 417, the table entry 414 needs to be corrected by storing the address of cache-slot 514 in pointer 418, setting the in_cache flag 618; and recalculating the track_ID_crc value 417 and storing it in field 516.

Lookup Table Correction Process 716

Figure 9:
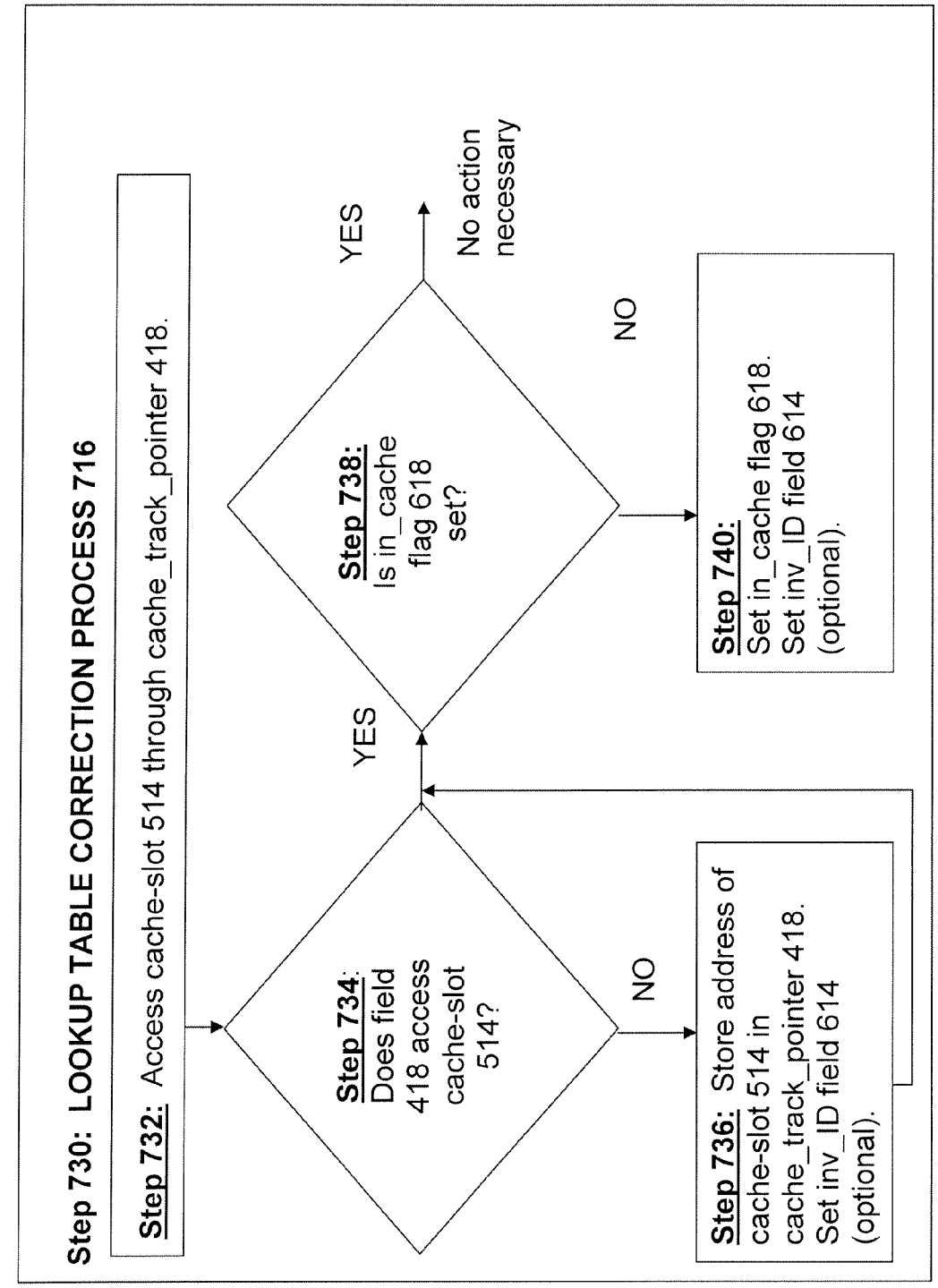
FIG. 9 is a flow diagram of the lookup table correction process 716 of the seriatim cache-slot review 712 shown in FIG. 7.

As shown in FIG. 9, the lookup table correction process 716 involves verifying the correctness of the meta-data stored in the lookup table portion 656 of each table entry 414 and correcting them, if necessary. Specifically, the correction process 716 confirms the validity of or corrects the in-cache status and association links for each table entry 414.

The process 716 starts with a step 732 of using the cache_track_pointer field 418 to access the data area 325. In a step 734, the process tests whether the table entry 414 accesses the cache-slot 514. If it does, the validity of the association links between the table entry 414 and the cache-slot 514 is confirmed because the backpointer stored in the cache-slot 514 had just also been used to access the table entry 414. Therefore, no action is necessary, and the process can proceed to the next step 738.

If the cache_track_pointer field 418 points to no cache-slot or to a cache-slot other than the cache-slot 514, the association links between the table entry 414 and the cache-slot 514 are not valid. In order to ensure proper association between the table entry 414 and the cache-slot 514, in a step 736, the process proceeds to store the address of the cache-slot 514 in the cache_track_pointer field 418 of the table entry 414.

A set in_cache flag 618 in the table entry 414 indicates that the data unit 514 associated with the table entry 414 may be found in the data area 325. Since a cache-slot in the data area 325 (namely, the cache-slot 514) has just been used to access the table entry 414, it is proper for the in_cache flag 618 to be set in the table entry 414. The process 716 tests the in_cache flag 618 in a step 738. If it is set, no action is necessary. If the in_cache flag 618 is not set, in a step 740 the process proceeds to set it in the table entry 414.

The Seriatim Table Entry Review 752

As shown in FIG. 7, the seriatim table entry review accesses table entries in the meta-data area 330 one by one to ensure that table entries therein that are not properly associated with a cache-slot in the cache memory are designated out-of-cache. Typically, the seriatim table entry review involves accessing every table entry in the meta-data area. However, accessing can be confined to a subset of the table entries in the meta-data area, such as to a set of table entries associated with a specific data storage device or logical volume. The selection of table entries to be accessed may depend upon the circumstances of the corruption event that triggered the meta-data recovery process.

Similar to with the seriatim cache-slot review 712, for each table entry 415, the seriatim table entry review 752 comprises a data protection validation process 754, to verify the validity of the data protection portion 654 of the table entry 415, and a table entry lookup table validation process 756, to verify the validity of the lookup table portion 656 of the table entry 415. If either validation fails, the table entry 415 is marked out-of-cache.

Also, as with the cache-slot review 712, the order in which these reviews are conducted is irrelevant and may be selected at the convenience of the meta-data recovery process designer. In the embodiment shown in FIGS. 10 and 11, the data protection validation process 754 precedes the table entry lookup table validation process 756.

Data Protection Validation Process 754

Figure 10:
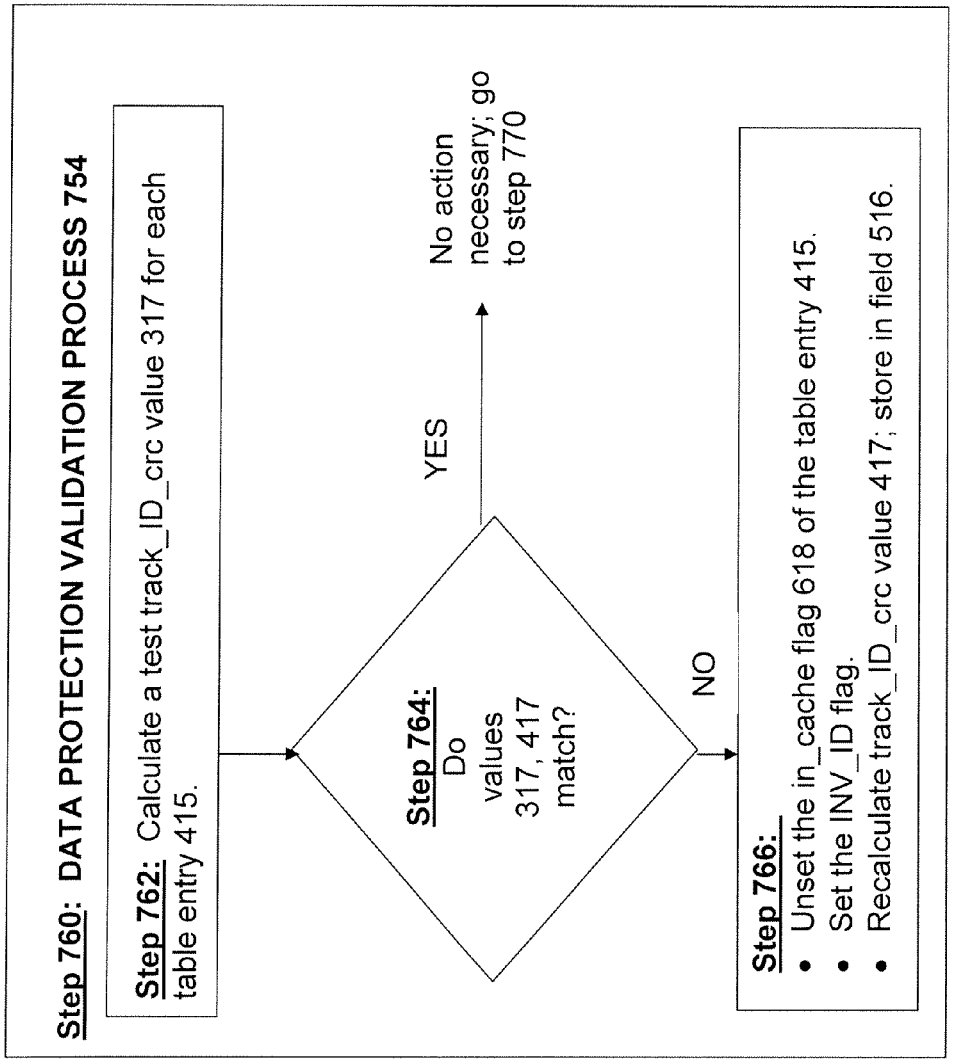
FIG. 10 is a flow diagram of the data protection validation process 754 of the seriatim table entry review 752 shown in FIG. 7.

As shown in FIG. 10, the data protection validation process 754 verifies the validity of the data protection for each table entry 415, and sets the table entry 415 as out-of-cache if validation cannot be so verified. The validity of the meta-data data protection for each table entry 415 is tested in the same manner as described above in the meta-data protection correction process 314, namely validating the track_ID_crc field 516 of a table entry 415.

In a step 762, a test track_ID_crc value is calculated, and in a step 764, compared to the stored track_ID_crc value 317 stored in the track_ID_crc field 516 in a table entry 415. If the track_ID_crc values 317, 417 match, the validity of the meta-data protection for the table entry 415 is confirmed. Further, if the meta-data protection for the table entry 415 is considered to be valid, it will be assumed that the data unit protection for the table entry 415, which can only be checked using the time-consuming process of accessing the logical volume on which the data unit is more permanently stored, may be considered to be valid. No action need be taken.

If values 317, 417 differ, the validity of the data protection in the table entry 415 should not be trusted. It should be noted that, previously, the seriatim cache-slot review 712 had just ensured the validity of the track_ID_crc field 516 of every table entry that was properly associated with every cache-slot in the data area 325. Therefore, any table entry 415 now accessed that does not have its stored track_ID_crc value 417 match a test track_ID_crc value 317 should not be used to access any cache-slot in the data area. Therefore, in a step 766 the process 754 unsets the in_cache flag 618 of the table entry 415, and then recalculates the track_ID_crc value 417 and stores it in the field 516.

Lookup Table Validation Process 756

Figure 11:
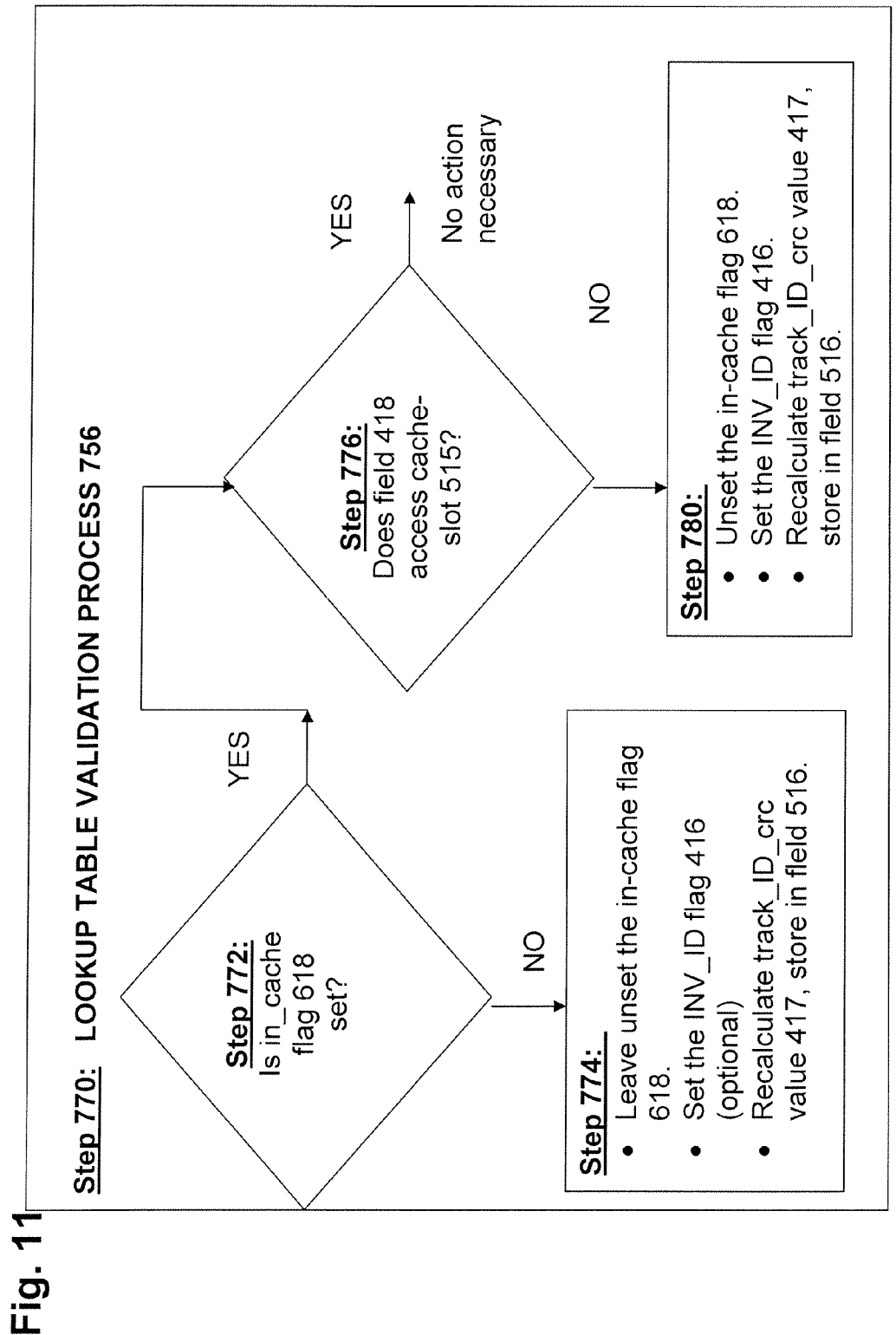
FIG. 11 is a flow diagram of the lookup table validation process 756 of the seriatim table entry review 752 shown in FIG. 7.

As shown in FIG. 11, the lookup table validation process 756 validates the lookup table portion 656 of each table entry 415, and marks the table entry 415 as out-of-cache if it can not be so validated. For every table entry 415, the status of the in_cache flag 618 is checked in a step 772.

If it is unset, the data unit 515 associated with the table entry 415 should not be considered to be in-cache. In a step 774, the lookup table validation process leaves the in_cache flag 618 unset, recalculates the track_ID_crc value 417 and stores it in field 516. If the table 415 is found to have a set in_cache flag 618, the lookup table validation process 756 proceeds to validate the association links between the table 415 and the cache-slot 515. Specifically, the contents of the cache_track pointer field 418 in table entry 415 is used to access the cache-slot 515 associated with the table entry 415 to confirm that the backpointer 518 stored therein accesses the table entry 415.

In a step 776, it is determined whether or not the table entry 415 and the cache-slot 515 point to each other. If they do, the validity of the links between the between the table entry 415 and the cache-slot 515 associated therewith is confirmed, and no action is necessary.

If the table entry 415 and cache-slot 515 do not point to each other, the association links cannot be confirmed. It should be noted that the seriatim cache-slot review 712 just completed had just confirmed or corrected the association links between every table entry that was properly associated with a cache-slot in the data area. Therefore, any table entry 415 having incorrect links between it and a cache-slot 756 should not be used to access any cache-slot in the data area. In a step 780, the in-cache flag 618 is unset for the table entry 415. The track_ID_crc value 417 is recalculated and stored in the field 516.

Deferred Rebuild Mode

In one embodiment of the current invention, the seriatim table entry review 752 provides table entries that are designated out-of-cache with an INV_ID flag 416, to indicate that rebuilding of the meta-data therein should be deferred until the attempt is made to access them. Because it is advantageous to provide users with access to as much information in the cache memory 320 as soon as possible, it is preferable to bring the data storage system 220, 225, 230 on-line but operating in a deferred rebuild mode such as that disclosed in the co-pending U.S. patent application Ser. No. 11/563,450, entitled METHODS AND SYSTEMS FOR MANAGING CORRUPTED META-DATA IN A COMPUTER SYSTEM OR NETWORK, filed on even date herewith, in which validation and repair of the data unit protection for the data units associated with table entries may be deferred until the first time an attempt is made to access them.

The deferred rebuild mode involves suspending the data unit protection associated with a table entry in order to prevent the data unit or table entry from being used by a host or other component of a computer system or network, and deferring re-establishing the data unit protection until a request for an I/O operation is made for the table entry. In a preferred embodiment, a data unit protection invalidity indicator (such as an INV_ID flag 416) is associated with table entries, and the data unit protection invalidity indicator is set to suspend data unit protection.

In operation, the set IN_VID flag 416 prevents the test track_ID_crc value 317 from being calculated and compared to the track_ID_crc value 417. The data unit protection remains suspended so long as the INV_ID flag 416 is set. Re-establishing the data unit protection occurs upon request for access to the table entry. Upon recognition of a set INV_ID flag 416 when such a request occurs, the data unit will be accessed at the logical volume on which is it is stored, and the meta-data associated with it (fields 411) will be corrected and the INV_ID flag 416 will be unset.

Figure 12:
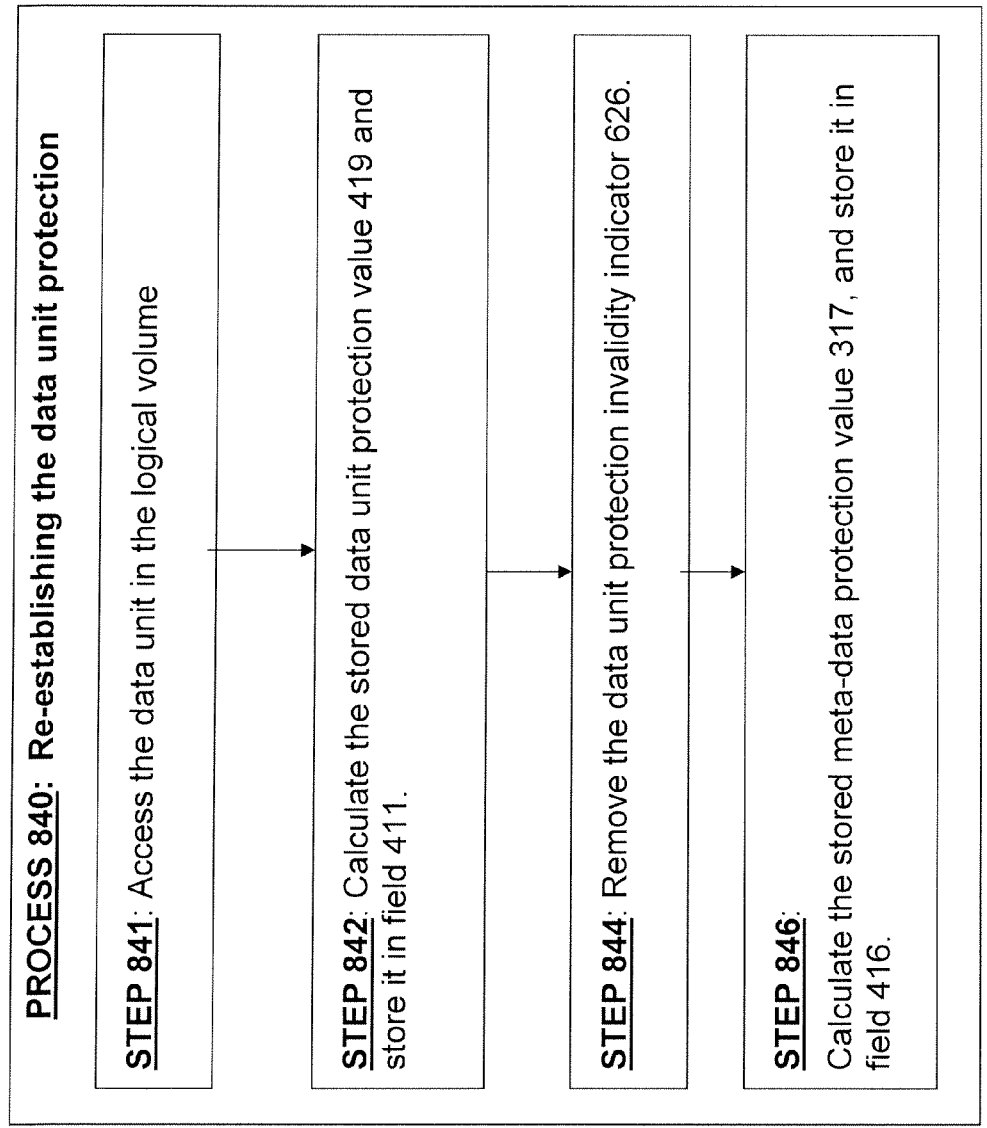
FIG. 12 is a flow diagram of the process for re-establishing the data unit protection for the table entry.

Specifically, as shown in FIG. 12, the data unit protection re-establishing process 840 starts with a step 841 of accessing the logical volume upon which the data unit resides. In a step 842, the user data protection value 419 is calculated and stored in the SECTOR_crc field 411. In a step 844, the data unit protection invalidity indicator 626 is removed. Finally, in a step 846, the meta-data protection value 417 is recalculated and stored in the field 516. The I/O operation would then proceed in the expected normal way. Subsequent requests for access to the table entry will proceed as normal. Use of deferred rebuild mode limits rebuilding of data to data that are currently needed for the operation of the computer system. In this way, users do not have to wait for extensive periods of time for data that are not currently needed to be repaired.

The deferred rebuild mode may be incorporated into the meta-data recovery process of the present invention in the seriatim table entry review 752. The INV_ID flag may be set in the data protection correction process 714 of step 720, when the meta-data values 317, 417 do not match or when the in_cache flag is found to be unset.

Even if the backup table entry is verified and stored in the field 516, the failure of the values 317, 417 to match is an indication that the data unit protection values potentially have been corrupted. Therefore, in the step 726, the INV_ID flag may be set to demonstrate the potential corruption. Further, the fact that the in_cache flag is unset for a table entry 414 that was accessed using a backpointer from a cache-slot 514 is an indication that the data unit protection values potentially have been corrupted. Therefore, in the step 740, the INV_ID flag may be set to demonstrate the potential corruption.

If a table entry 415 is marked out-of-cache for whatever reason, whether in a step 780 for an inability to confirm its association links with the cache-slot 515 or in a step 766 for having an invalid stored track_ID_crc value 417, the INV_ID flag 416 may also be set to defer rebuilding of the untrustworthy table entry until the table entry is actually needed for an I/O operation.

If, during step 772 of the seriatim table entry review 752, a table entry 415 was found to have its in_cache flag unset, in the step 774 the INV_ID flag may also be set. Whether or not to set the INV_ID flag 416 in this situation depends upon the extent of confidence that is desired in the data storage system.

It should be recognized that, whenever the INV_ID flag 416 is set in a table entry, whether a table entry 414 in the seriatim cache-slot review 712 or a table entry 415 in a seriatim table entry review 752, the setting of the flag causes the meta-data in the table entry to be changed. Similarly, whenever the INV_ID flag 416 is unset in a table entry as a part of the data unit protection re-establishing process 840, the setting of the flag 416 causes the meta-data in the table entry to be changed. Therefore, whenever the INV_ID flag 416 is set or unset in a table entry, the track_ID_crc value 417 is recalculated and stored in the track_ID_crc field 516.

In an alternative embodiment, during the seriatim cache-slot review 712, the table entries that are identified as in need of the setting of the INV_ID flag 416 are marked with a special "in progress" tag indicating they are being worked on; then in the seriatim table entry review 752 the "in progress" tag is removed and the INV_ID flag 416 is set. The application of an "in progress" tag aids with completing the meta-data rebuild of the present invention if the scans described herein were aborted before completion. Further, the application of an "in progress" tag allows the data units to be ignored by other scans that might be required by the computer system or network and by any background scrubber employed by the computer system or network. Finally, the application of an "in progress" tag allows identification in the seriatim table entry review 752 of which table entries were identified as being in need of the setting of the INV_ID flag 416 before the scan started.

Software 800

The method 700 may be embodied in a computer program product such as memory control software 800 residing on a computer readable medium for recovering meta-data for a computer system that have been subjected to corruption. The memory control software 800 shown in FIG. 2 has instructions for causing a computer such as processor 22 to implement the method 700 shown in FIG. 7. Specifically, it has instructions for performing the seriatim cache-slot review 712 performed by step 710 for accessing every cache-slot 514 in the data area 325 one after the other in order to identify and ensure the validity of each table entry 414 in the meta-data area that is currently associated with a cache-slot 514. It has instructions for performing the seriatim table entry review 752 of step 750, in which every table entry 415 in the meta-data area 330 is accessed one after the other.

In the seriatim cache-slot review 712, the software 800 has instructions for performing the data protection correction process 714 of the step 720 (shown in FIG. 8) and the lookup table correction process 716 of the step 730 (shown in FIG. 9). Referring to FIG. 8, for the data protection correction process 714, the software 800 has instructions for performing step 722 of calculating a test track_id_crc value 317 for each table entry 414, and the step 724 of comparing the values 317, 417. If the values 317, 417 do not match, the software 800 has instructions for performing the step 726 for correcting the table entry 414.

Referring to FIG. 9, for the lookup table correction process 716, the software 800 has instructions for performing the step 732 of using the cache_track_pointer field 418 to access the data area 325, and the step 734, of testing whether the table entry 414 accesses the cache-slot 514. If it does, the software 800 has instructions for proceeding to the next step 738. If the table entry 414 does not access the cache-slot 514, the software 800 has instructions for performing the step 736 of storing the address of the cache-slot 514 in the cache_track pointer field 418 of the table entry 414. The software 800 has instructions for performing the step 738 of testing the in_cache flag 618 in the table entry 414. If the in_cache flag 618 is not set, it has instructions for performing the step 740 of setting the in_cache flag 618 in the table entry 414.

In the seriatim table entry review 714, the software 800 has instructions for performing the data protection validation process 754 of step 760 (shown in FIG. 10) and the lookup table validation process 756 of step 770 (shown in FIG. 11). Referring to FIG. 10, for the data protection validation process 754, the software 800 has instructions for performing the step 762 of calculating a test track_ID_crc value, and for performing the step 764 of comparing the values 317, 417. If the values 317, 417 do not match, the software 800 has instructions for performing the step 766 of unsetting the in_cache flag 618 of the table entry 415.

Referring to FIG. 11, for the table entry lookup table validation process 756, the software 800 has instructions for performing the step 772 of checking the status of the in_cache flag 618. If it is unset, the software 800 has instructions for performing the step 774 of leaving the in_cache flag unset. If the table 415 is found to have a set in_cache flag 618, the software 800 has instructions for validating the association links between the table 415 and the cache-slot 515. Specifically, the software 800 has instructions for performing the step 776 to determine whether or not the table entry 415 and the cache-slot 515 point to each other. If they do not, the software 800 has instructions for performing the step 780 of unsetting the in-cache flag 618 for the table entry 415.

Finally, the software 800 also may have instructions for deferring the meta-data rebuild for table entries that are designated out-of-cache until the attempt is made to access them for an I/O operation. Specifically, the software 800 may have instructions for providing an INV_ID flag 416 in the seriatim cache-slot review 712, specifically in the step 726, when the meta-data values 317, 417 do not match, and in the step 736, when the association links can not be confirmed for the table entry 414 and the cache-slot 514, and in a step 740, when the in_cache flag for the table entry 414 was set. The software 800 may have instructions for providing an INV_ID flag 416 in the seriatim table entry review 752 in a step 780 when the association links can not be confirmed for the table entry 415 and the cache-slot 515, and in a step 766 when the meta-data values 317, 417 do not match, and in the step 774 of the seriatim table entry review 752 for a table entry 415 that was found to have its in_cache flag unset.

CONCLUSION

Using the meta-data recovery process of the present invention described herein, the data storage system 220 can synchronize the cache and table, identifying what is out-of-cache and validating the meta-data associated with what is in-cache, often in a matter of minutes. Recovery from partial corruption of meta-data may proceed in a manner that will not significantly impact the availability of most of the data units in the cache memory 320. Thus, the meta-data recovery process of the present invention provides a method to recover quickly from corruption of meta-data in a cache memory.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. For a cache memory having meta-data organized into a plurality of table entries, and having data units stored in a plurality of cache-slots, with each of the cache-slots being arranged to be associated with one of the table entries; a method for recovering meta-data that have been subjected to corruption, comprising providing each of the table entries with an in-cache indicator to indicate that the data unit associated therewith is stored in the cache memory;

conducting a first review of the table entries, further comprising identifying in-cache table entries comprising the table entries that are associated with cache-slots in the cache memory, performing a correction attempt on each of the in-cache table entries to ensure that the meta-data in each of the in-cache table entries are validated and corrected, if necessary, and ensuring that the in-cache indicator is set for each of the in-cache table entries; and conducting a second review of the table entries, further comprising identifying not-in-cache table entries comprising the table entries that are not associated with cache-slots in the cache memory, identifying invalid table entries comprising the in-cache table entries for which the correction attempt was unsuccessful;

ensuring that the in-cache indicator is not set for any of the not-in-cache table entries and for any of the invalid table entries.

2. The method of claim 1, wherein conducting the first review further comprises conducting a seriatim review of each of the cache-slots, the seriatim review further comprising selecting a first cache-slot;

identifying a first table entry that is associated with the first cache-slot;

determining whether the first table entry is in need of repairing; and performing a correction attempt on the first table entry to correct and verify validity of the meta-data in the first table entry when the first table entry is determined to be in need of repairing.

3. The method of claim 2, wherein each of the table entries has a stored meta-data protection value and each of the cache-slots has a backup table entry comprising a backup copy of an associated table entry comprising a table entry associated therewith; and further comprising conducting a data protection correction process to verify validity of a data protection portion of the first table entry by calculating a test meta-data protection value from the first table entry;

comparing the test meta-data protection value and the stored meta-data protection value; and when the test meta-data protection value and the stored meta-data protection value do not match, determining whether the backup table entry is in need of repairing; and, if the backup table is not in need of repairing, replacing the first table entry with the backup table entry.

4. The method of claim 2, wherein the first table entry has a cache-slot association link comprising a pointer to one of the cache-slots to link the first table entry to the one of the cache-slots; and further comprising conducting a lookup table correction process to verify validity of a lookup table portion of the first table entry; wherein the lookup table correction process further comprises confirming the cache-slot association link from the first table entry to the first cache-slot by using the cache-slot association link to access the one of the cache-slots; and replacing the cache-slot association link with a pointer to the first cache-slot when the cache-slot association link does not access the first cache-slot.

5. The method of claim 1, wherein conducting the second review further comprises conducting a seriatim review of each of the table entries, the seriatim review further comprising selecting a first table entry;

determining whether the first table entry is in need of repairing;

ensuring that the in-cache indicator is unset for the first table entry when the first table entry is in need of repairing.

6. The method of claim 5, wherein each of the table entries has a stored meta-data protection value; and further comprising conducting a data protection validation process to verify validity of a data protection portion of the first table entry by calculating a test meta-data protection value from the first table entry;

comparing the test meta-data protection value and the stored meta-data protection value; and ensuring that the in-cache indicator is unset for the first table entry when the test meta-data protection value and the stored meta-data protection do not match.

7. The method of claim 5, wherein the first table entry has a cache-slot association link comprising a pointer to one of the cache-slots to link the first table entry to the one of the cache-slots;

further comprising conducting a lookup table validation process to verify validity of a lookup table portion of the first table entry; wherein the lookup table validation process further comprises confirming the cache-slot association link from the first table entry to the first cache-slot by using the cache-slot association link to access the one of the cache-slots; and ensuring that the in-cache indicator is unset for the first table entry when the cache-slot association link does not access the first cache-slot.

8. The method of claim 1, wherein each of the table entries has a data protection process associated therewith, and further comprising:

suspending the data protection process for any of the table entries for which the in-cache indicator is not set; and deferring re-establishing the data protection process for a first table entry for which the in-cache indicator is not set until issuance of a request for an I/O operation therefor.

9. The method of claim 1, wherein each of the table entries has a data protection process associated therewith, and further comprising:

suspending the data protection process for any of the not-in-cache table entries; and deferring re-establishing the data protection process for a first not-in-cache table entry until issuance of a request for an I/O operation therefor.

10. The method of claim 1, wherein each of the table entries has a data protection process associated therewith, and further comprising:

suspending the data protection process for any of the invalid table entries; and deferring re-establishing the data protection process for a first invalid table entry until issuance of a request for an I/O operation therefor.

11. A computer program product residing on a computer readable storage medium for recovering meta-data for a computer system that have been subjected to corruption, the computer system having a cache memory with the meta-data organized into a plurality of table entries, and with data units stored in a plurality of cache-slots, each of the cache-slots being arranged to be associated with one of the table entries;

the computer program product comprising instructions for causing a computer to:

conduct a first review of the table entries, further comprising identifying in-cache table entries comprising the table entries that are associated with cache-slots in the cache memory, performing a correction attempt on each of the in-cache table entries to ensure that the meta-data in each of the in-cache table entries are validated and corrected, if necessary, and ensuring that the in-cache indicator is set for each of the in-cache table entries; and conduct a second review of the table entries, further comprising identifying not-in-cache table entries comprising the table entries that are not associated with cache-slots in the cache memory, identifying invalid table entries comprising the in-cache table entries for which the correction attempt was unsuccessful;

ensuring that the in-cache indicator is not set for any of the not-in-cache table entries and for any of the invalid table entries.

12. The computer program product of claim 11, wherein the instructions for causing a computer to conduct a first review of the table entries further comprises instructions to cause a computer to conduct a seriatim review of each of the cache-slots, the seriatim review further comprising selecting a first cache-slot;

identifying a first table entry that is associated with the first cache-slot;

determining whether the first table entry is in need of repairing; and performing a correction attempt on the first table entry to correct and verify validity of the meta-data in the first table entry when the first table entry is determined to be in need of repairing.

13. The computer program product of claim 11, wherein the instructions for causing a computer to conduct a second review of the table entries further comprises instructions to cause a computer to conduct a seriatim review of each of the table entries, the seriatim review further comprising selecting a first table entry;

determining whether the first table entry is in need of repairing;

ensuring that the in-cache indicator is unset for the first table entry when the first table entry is in need of repairing.

14. The computer program product of claim 11, wherein each of the table entries has a data protection process associated therewith, and further comprising instructions for causing a computer to:

suspend the data protection process for any of the table entries for which the in-cache indicator is not set; and defer re-establishing the data protection process for a first table entry for which the in-cache indicator is not set until issuance of a request for an I/O operation therefor.

15. A data storage system comprising:

a cache memory having meta-data organized into a plurality of table entries, and having data units stored in a plurality of cache-slots, each of the cache-slots being arranged to be associated with one of the table entries; and a processor coupled to the cache memory and operable to recover meta-data that have been subjected to corruption, the processor further operable to conduct a first review of the table entries, further comprising identifying in-cache table entries comprising the table entries that are associated with cache-slots in the cache memory, performing a correction attempt on each of the in-cache table entries to ensure that the meta-data in each of the in-cache table entries are validated and corrected, if necessary, and ensuring that the in-cache indicator is set for each of the in-cache table entries; and conduct a second review of the table entries, further comprising identifying not-in-cache table entries comprising the table entries that are not associated with cache-slots in the cache memory, identifying invalid table entries comprising the in-cache table entries for which the correction attempt was unsuccessful;

ensuring that the in-cache indicator is not set for any of the not-in-cache table entries and for any of the invalid table entries.

16. The data storage system of claim 15, wherein the processor being operable to conduct a first review of the table entries further comprises the processor being operable to conduct a seriatim review of each of the cache-slots, the seriatim review further comprising selecting a first cache-slot;

identifying a first table entry that is associated with the first cache-slot;

determining whether the first table entry is in need of repairing; and performing a correction attempt on the first table entry to correct and verify validity of the meta-data in the first table entry when the first table entry is determined to be in need of repairing.

17. The data storage system of claim 15, wherein the processor being operable to conduct a second review of the table entries further comprises the processor being operable to conduct a seriatim review of each of the table entries, the seriatim review further comprising selecting a first table entry;

determining whether the first table entry is in need of repairing;

ensuring that the in-cache indicator is unset for the first table entry when the first table entry is in need of repairing.

18. The data storage system of claim 15, wherein each of the table entries has a data protection process associated therewith, and further comprising the processor being operable to:

suspend the data protection process for any of the table entries for which the in-cache indicator is not set; and defer re-establishing the data protection process for a first table entry for which the in-cache indicator is not set until issuance of a request for an I/O operation therefor.

* * * * *